(12) United States Patent
Goel et al.

(10) Patent No.: US 10,410,242 B1
(45) Date of Patent: Sep. 10, 2019

(54) KEYWORD HELPER

(71) Applicant: Google LLC, Mountain View, CA (US)

(72) Inventors: Kavi J. Goel, San Francisco, CA (US);
Ariel H. Bardin, Belmont, CA (US);
Thomas R. Stanis, Saratoga, CA (US);
Susanne Brokaw, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 490 days.

(21) Appl. No.: 15/072,706

(22) Filed: Mar. 17, 2016

Related U.S. Application Data

(63) Continuation of application No. 11/869,707, filed on Oct. 9, 2007, now abandoned.

(51) Int. Cl.
*G06Q 30/02* (2012.01)

(52) U.S. Cl.
CPC ..... *G06Q 30/0244* (2013.01); *G06Q 30/0256* (2013.01)

(58) Field of Classification Search
CPC .................................................. G06Q 30/0244
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman, II et al. |
| 6,167,382 A | 12/2000 | Sparks et al. |
| 6,269,361 B1 | 7/2001 | Davis et al. |
| 6,401,075 B1 | 6/2002 | Mason et al. |
| 6,985,882 B1 | 1/2006 | Del Sesto |

(Continued)

FOREIGN PATENT DOCUMENTS

WO        WO 97/21183        6/1997

OTHER PUBLICATIONS

Wright, Brenda, "Keyword Sucess in Search Engine Marketing", Dec. 5, 2005. (Year: 2005).*

(Continued)

*Primary Examiner* — Eric T Wong
(74) *Attorney, Agent, or Firm* — Fish & Richardson P.C.

(57) ABSTRACT

A display of a computing device is updated to present an electronic user interface that provides a keyword entry control. Through the keyword entry control, keywords are received that are associated with an advertisement. Computer processors are used to determine whether keywords are overbroad in accordance with a ratio of a number of times that the keywords have been used in search queries provided by users to a click-through rate of other advertisements presented to the users responsive to the search queries. Low-performing keywords are identified from the overbroad keywords. At the display of the computing device, the electronic user interface is updated to present a visualization of a list of the low-performing keywords, and to provide a set of interactive controls. The set of one or more interactive controls includes a given control that removes a corresponding low-performing keyword from being associated with the advertisement.

23 Claims, 6 Drawing Sheets

(56) References Cited

U.S. PATENT DOCUMENTS

| | | | |
|---|---|---|---|
| 7,136,875 B2 | 1/2006 | Anderson et al. | |
| 7,039,599 B2 | 5/2006 | Merriman | |
| 2005/0222902 A1* | 10/2005 | Coit | G06Q 30/02 705/14.6 |
| 2007/0100803 A1* | 5/2007 | Cava | G06F 17/3064 |
| 2007/0118392 A1* | 5/2007 | Zinn | G06Q 30/02 705/1.1 |
| 2008/0052278 A1* | 2/2008 | Zlotin | G06Q 30/02 |
| 2013/0238420 A1* | 9/2013 | Barnette, Jr. | G06Q 30/02 705/14.42 |
| 2014/0229282 A1* | 8/2014 | Koran | G06Q 30/02 705/14.54 |

OTHER PUBLICATIONS

Inside AdWords, "AdWords Optimization Tips", Apr. 24, 2007. (Year: 2007).*
Confessions of an IT Consultant, "Google Ads", Apr. 23, 2007. (Year: 2007).*
Davis, Dave, "10 Ways to Increase Your Adwords Quality Score—A Mini Case Study", Mar. 7, 2007. (Year: 2007).*
Thies, Dan, "Find Your Best Search Term With Adwords", Jul. 8, 2003. (Year: 2003).*
Richardson et al., "Predicting Clicks: Estimating the Click-Through Rate for New Ads", WWW 2007, May 8-12, 2007, Banff, Alberta, Canada. (Year: 2007).*
U.S. Appl. No. 95/001,061, Reexamination of Stone et al.
U.S. Appl. No. 95/001,068, Reexamination of Stone et al.
U.S. Appl. No. 95/001,069, Reexamination of Dean et al.
U.S. Appl. No. 95/001,073, Reexamination of Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Confessions of an IT Consultant, "Google Ads", Apr. 23, 2007.
Davis, Dave, "10 Ways to Increase Your Adwords Quality Score—A Mini Case Study", Mar. 7, 2007.
Dedrick, R., Interactive Electronic Advertising, IEEE, 1994.
Dedrick, R., A Consumption Model for Targeted Electronic Advertising, Intel Architecture Labs, IEEE, 1995.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
Inside AdWords, "AdWords Optimization Times", Apr. 24, 2007.
Request for Reexamination of U.S. Pat. No. 6,446,045 B1, Control No. 95/001,061.
Request for Reexamination of U.S. Pat. No. 6,829,587 B2, Control No. 95/001,068.
Request for Reexamination of U.S. Pat. No. 7,240,025 B2, Control No. 95/001,073.
Request for Reexamination of U.S. Pat. No. 7,249,059 B2, Control No. 95/001,069.
Wright, Brenda, "Keywords Success in Search Engine Marketing", Dec. 5, 2005.
Zeff, R. et al., Advertising on the Internet, $2^{nd}$ Ed., John Wiley & Sons, 1999.
Thies, Dan, "Find Your Best Search Terms With Adwords", Jul. 8, 2003.
Richardson et al., "Predicting Clicks: Estimating the Click-Through Rate for New Ads", WWW 2007, May 8-12, 2007, Banff, Alberta, Canada.

* cited by examiner

KEYWORD HELPER

CROSS-REFERENCE TO RELATED APPLICATIONS

This application is a continuation application of and claims priority to U.S. application Ser. No. 11/869,707, filed on Oct. 9, 2007, the entire contents of which are hereby incorporated by reference.

TECHNICAL FIELD

This document generally relates to information management.

BACKGROUND

The selection of advertisements for presentation (e.g., display), such as with search results and other information, and the ordering of those advertisements, may be achieved by various techniques. In one exemplary technique, an initial determination is made to identify all advertisements that are a match or near match for applied search terms or other query items or information. The match may be made, for example, between one or more words in a query, and keywords associated with a particular advertisement or group of advertisements. These keywords can be either single words or phrases identified by the advertiser or generated by one of a number of known keyword suggesting means. The selection of proper keywords is important to advertisers because the keywords have a large influence on when the advertisement that they are associated with is presented to the user.

SUMMARY

The present disclosure includes a system and method for checking keywords associated with a content item (e.g., an advertisement or "ad"). In general, in one aspect, low-performing keywords are automatically identified and an alert message is generated when an advertiser attempts to enter such keywords while setting up an ad campaign.

In general, in another aspect, one or more keywords that are associated with an advertisement are accepted; one or more low-performing keywords are identified from among the one or more keywords, the one or more low-performing keywords having a likelihood of causing the advertisement to have a performance below a threshold, the performance of the advertisement being determined based on a predefined criterion; and the low-performing keywords are outputted.

Implementations may include one or more of the following features. Identifying the low-performing keywords can include determining whether one or more of the keywords is too broad based on a predetermined criterion. Determining whether a keyword is too broad can include determining whether the keyword has been used as a keyword in search queries more than a predetermined number of times for a given period of time. Determining whether a keyword is too broad can include determining whether advertisements associated with the keyword have an average click-through rate below a predetermined value. Identifying the low-performing keywords can include determining whether the one or more keywords are too specific based on a predetermined criterion. Determining whether the one or more keywords are too specific can include determining whether a predetermined percentage of the one or more keywords receive impressions that are less than a threshold for a given period of time. Determining whether the one or more keywords are too specific can include determining whether a sum of the number of impressions of the one or more keywords is below a predetermined value for a given period of time. Determining whether the one or more keywords are too specific can include determining whether one or more keywords contain more than a predetermined number of words.

Identifying the low-performing keywords can include determining whether the one or more keywords are too obscure. Determining whether the one or more keywords are too obscure can include determining whether a predetermined percentage of the one or more keywords receive impressions that are less than a threshold for a given period of time. Determining whether the one or more keywords are too obscure can include determining whether a sum of the number of impressions of the one or more keywords is below a predetermined value for a given period of time. Identifying low-performing keywords can include determining whether the total number of keywords is less than a predetermined number.

Identifying the low-performing keywords can include determining the approximate number of times that the advertisement will be displayed. Determining the approximate number of times that the advertisement will be displayed can include computing the number of impressions for one or more of the accepted keywords over a given period of time. Identifying the low-performing keywords can include determining the historical effectiveness of one or more of the keywords. Determining the historical effectiveness of one or more of the keywords can include computing the click-through rate for one or more of the accepted keywords over a given period of time. Identifying the one or more low-performing keywords can include determining whether any of the keywords uses a non-character symbol that is not permitted by a system for serving the advertisement. Identifying the one or more low-performing keywords can include determining whether the one or more keywords include words or phrases that are prohibited by a system for serving the advertisement. A message is generated stating that use of the low-performing keywords may result in low performance of the advertisement.

In general, in another aspect, a quality of one or more keywords that are associated with an advertisement is evaluated; and a message is generated indicating at least one of (a) one or more of the keywords are too general, (b) the one or more keywords are too specific, (c) the one or more keywords are too obscure, or (d) the number of keywords is too low.

In general, in another aspect, one or more low-performing keywords are identified from among the one or more keywords that are associated with an ad advertisement, the one or more low-performing keywords having a likelihood of causing the advertisement to have a performance below a threshold, wherein the low-performing keywords are identified based on a first set of criteria that examines each keyword individually and a second set of criteria that examines the one or more keywords collectively.

Implementations may include one or more of the following features. The first set of criteria includes determining whether a keyword is too broad, and the second set of criteria includes determining whether the one or more keywords are too specific or obscure.

In general, in another aspect, a user interface is provided to allow input of one or more ad keywords that are associated with an advertisement, and output of one or more low-performing keywords; and a keyword checker is provided to identify the one or more low-performing keywords from among the one or more ad keywords in which the one or more low-performing keywords have a likelihood of causing the advertisement to have a performance below a threshold, the performance of the advertisement being determined based on a predefined criterion.

Implementations may include one or more of the following features. The keyword processing engine identifies the one or more low-performing keywords based on historical performance data of advertisements associated with the one or more keywords. The system includes a database to store the historical performance data of advertisements.

In general, in another aspect, an apparatus includes means for accepting one or more keywords that are associated with an advertisement; means for identifying one or more low-performing keywords from among the one or more keywords, the one or more low-performing keywords having a likelihood of causing the advertisement to have a performance below a threshold, the performance of the advertisement being determined based on a predefined criterion; and means for outputting the low-performing keywords.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
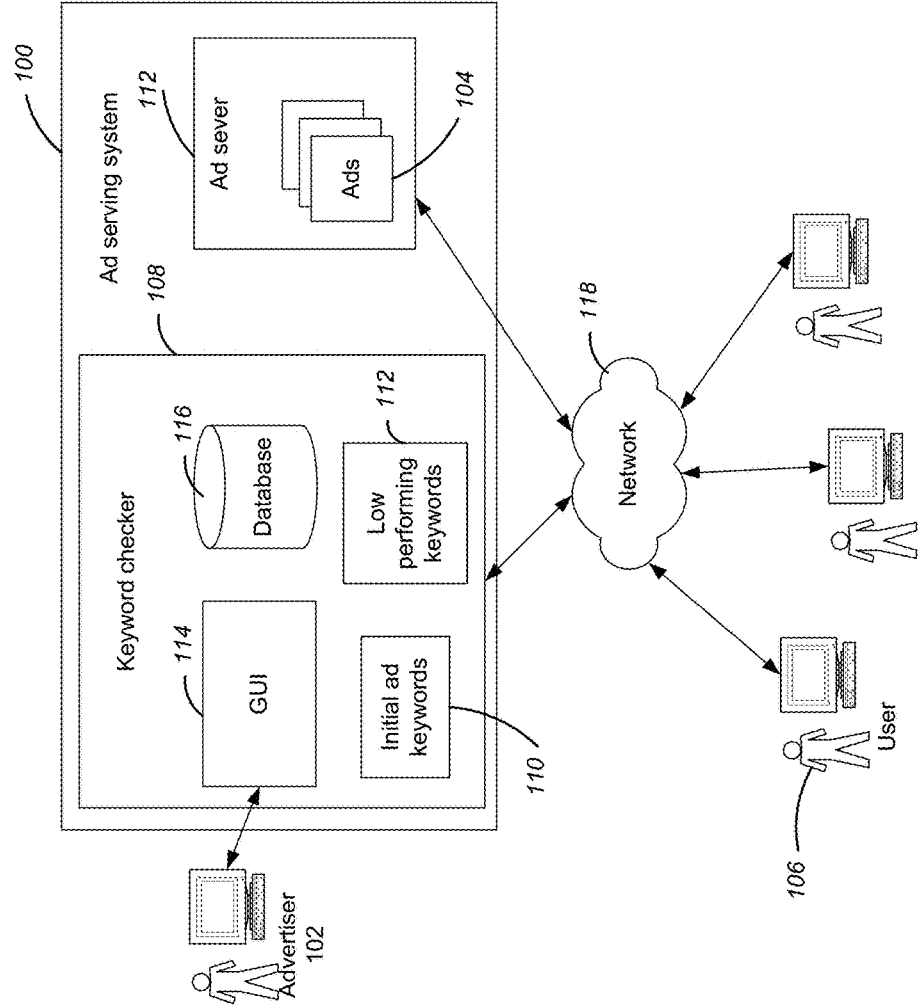
FIG. 1 is a block diagram of an example ad serving system.

FIG. 1 is a schematic diagram of an example ad serving system 100 that allows advertisers 102 (sponsors of advertisements, or ads 104) to participate in an ad network and set up ad campaigns to serve the ads 104 to users 106. The ads 104 can be presented with a variety of on-line content, such as web pages and video programs. An advertiser 102 can provide keywords that are associated with an ad 104 so that the ad 104 is delivered when, e.g., the keywords match certain search terms or content. The system 100 includes a keyword checker 108 to check the quality of the keywords to allow the advertiser 102 to increase the effectiveness of the ad campaign.

For example, some keywords may not be appropriate for the ad 104 because the keywords are too general or too specific such that the ad 104 is served less often or is matched with content that is less relevant, resulting in a lower click-through rate than if appropriate keywords were used. The keyword checker 108 receives an initial set of keywords 110 provided by the advertiser 102, and identifies keywords 112 that will likely cause the ad 104 to have a low performance (e.g., low click-through rate or conversion rate). Such keywords 112 are referred to as "low-performing keywords 112".

In some implementations, when the advertiser 102 configures the ad campaign and enters keywords 110 associated with an ad 104, the keyword checker 108 automatically checks the quality of each keyword 110. In some examples, the keyword checker 108 checks the keywords 110 upon request from the advertiser 102. When the low-performing keywords 112 are identified, the keyword checker 118 generates a message to alert the advertiser 102. The advertiser 102 can remove or edit the low-performing keywords 112, or ignore the alert message.

Some low-performing keywords 112 are ad-specific. A keyword 112 that causes one ad 104 to be low performing does not necessarily cause another ad 104 to be low performing. The keyword checker 108 determines future performance of ads 104 and its associated keywords based on, e.g., predetermined rules and past performance of other ads with the same or similar keywords. Because ads 104 can be creative, a low performing keyword 122 identified by the keyword checker 108 does not necessarily cause the ad 104 to become low performing. For example, to advertise a particular niche product or service, the advertiser 102 may deliberately choose words that may appear nerdy or obscure to target a niche audience.

The term "keyword" in this description refers to a string of one or more characters and can include one or more words or phrases in any language. The keywords 110 associated with an ad 104 affect when the ad 104 is presented or served to a user 106. The number of times that an ad 104 is served to a user 106 is referred to as the number of impressions. An advertiser 102 may select keywords using, e.g., words or phrases that a user 106 may enter into a search engine, or words or phrases that frequently appear in online content. When appropriate keywords 110 are chosen, there is a higher likelihood that the ad 104 will be presented to users most likely to be interested in the goods or services advertised.

Some advertisers 102 may not be familiar with the process of how ads 104 are matched with search terms or content, and may not select effective keywords. As a result, the keywords provided by the advertiser 106 can be, e.g., too broad, too specific, or otherwise low-performing for a number of reasons. Overbroad keywords can cause the ad 104 to be displayed to users 106 not interested in the advertised goods or services. For example, keywords such as "textile", "apparel", and "quality" may be too broad for an advertisement for a clothing retail store. Keywords that are too specific or narrow may generate little traffic so that the ad 104 is shown to few users 106. For example, keywords such as "don lapre greatest vitamin in the world" and "search for romance for men and women worldwide" may be too specific.

Some keywords may not be good search terms. For example, keywords such as "money back guarantee", "free shipping", and "best service" do little to distinguish the ad 104. Keywords that include typos or are otherwise poorly suited for displaying the ad 104 effectively (e.g., "windowe wasching survise") may result in the ad 104 not reaching its intended audience and having a low performance.

The system 100 can increase the relevancy of ads presented to the users 106 by detecting low-performing keywords 112. In some examples, when low-performing keywords 112 are removed from the ad campaign, the performance of the ad 104 can be improved. The performance of the ad 104 can be measured by various criteria, such as click-through rate and conversion rate. Click-through rate refers to the number of times that the ad 104 is clicked divided by the number of impressions. The conversion rate refers to the number of times that a desired action is taken by a user 106 divided by the number of impressions. The desired action can be, e.g., making a purchase, signing up an account, viewing a particular web page, downloading a document, connecting to a salesperson, or completing a survey.

The keyword checker 108 examines the initial ad keywords 110 provided by the advertiser 102 and generates an alert message when low performing keywords 112 are found. The following describes various examples of the criteria for identifying low performing keywords 112.

For example, the keyword checker 110 may determine whether an "illegal" symbol is included in the initial set of keywords 110. For example, an ad server 112 may require that ad keywords contain only alphanumeric characters, so any symbol that is a non-alphanumeric character may be treated as illegal. Ads associated with illegal keywords may result in the ad not being served or served with irrelevant content.

In some implementations, the keyword checker 110 may determine whether a keyword is prohibited. For example, a keyword can be prohibited if it is offensive or abusive. Keywords that are prohibited when serving ads in one region (e.g., country) may be different from keywords that are prohibited when serving ads in another region. The engine 108 may maintain a list of prohibited or abusive words for use as reference.

In some implementations, the engine 108 may determine whether a keyword is too broad. For example, a keyword is too broad if the following conditions are met:

Search volume is greater than a predetermined number (e.g., 12,000) of impressions per year. This means that the number of times that the keyword has been used as a keyword in search queries is more than the predetermined number.

The global click-through rate (average or median across advertisers) is below a predetermined value (e.g., 0.5).

In some implementations, the engine 108 may determine whether the initial set of keywords 110 are too specific. For example, an initial set of keywords may be too specific if the following conditions are met:

According to historical data, at least a predetermined percentage (e.g., 50%) of the initial set of keywords obtain fewer than a predetermined number (e.g., 300) of impressions per year.

Of the low traffic keywords, at least a predetermined percentage (e.g., 50%) contain at least four words.

The total traffic is below a predetermined number (e.g., 1500) of impressions per year.

A set of keywords that are not too specific may nonetheless be too obscure. For example, a set of keywords may be too obscure if the following conditions are met:

According to historical data, at least a predetermined percentage (e.g., 50%) of the set of keywords obtain fewer than a predetermined number (e.g., 300) of impressions per year.

The total traffic is below a predetermined number (e.g., 1500) of impressions per year.

In some implementations, if the set of keywords are not too specific or obscure, the engine 108 may determine whether there are too few keywords in the set. The engine 108 may generate an alert message if the number of keywords in the set is too small, or if the total traffic generated by the set of keywords is below a predetermined number (e.g., 3600) of impressions per year.

The keyword checker 108 may flag a keyword that has been identified as requiring the advertiser 102 to enter a special pass code or identifier. For example, the ad network may require advertisers 102 to obtain a pharmacy checker identifier in order to use keywords that include pharmaceutical terms or are related medical products or services.

The keyword checker 108 may identify other categories of keywords that are likely to cause ads to be low performing, using criteria other than those listed above.

The keyword checker 108 includes databases 116 that contain past statistical information about performances of ads associated with various keywords. A graphical user interface 114 allows the advertiser 102 to enter keywords 110, and displays alert messages listing the low performing keywords 112. The GUI 114 includes a server component and a client component in which the client component executes at the terminal of the advertiser 102.

The advertisers 102 and the users 106 are connected to the system 100 through a network 118, which can be, e.g., the Internet.

Figure 2:
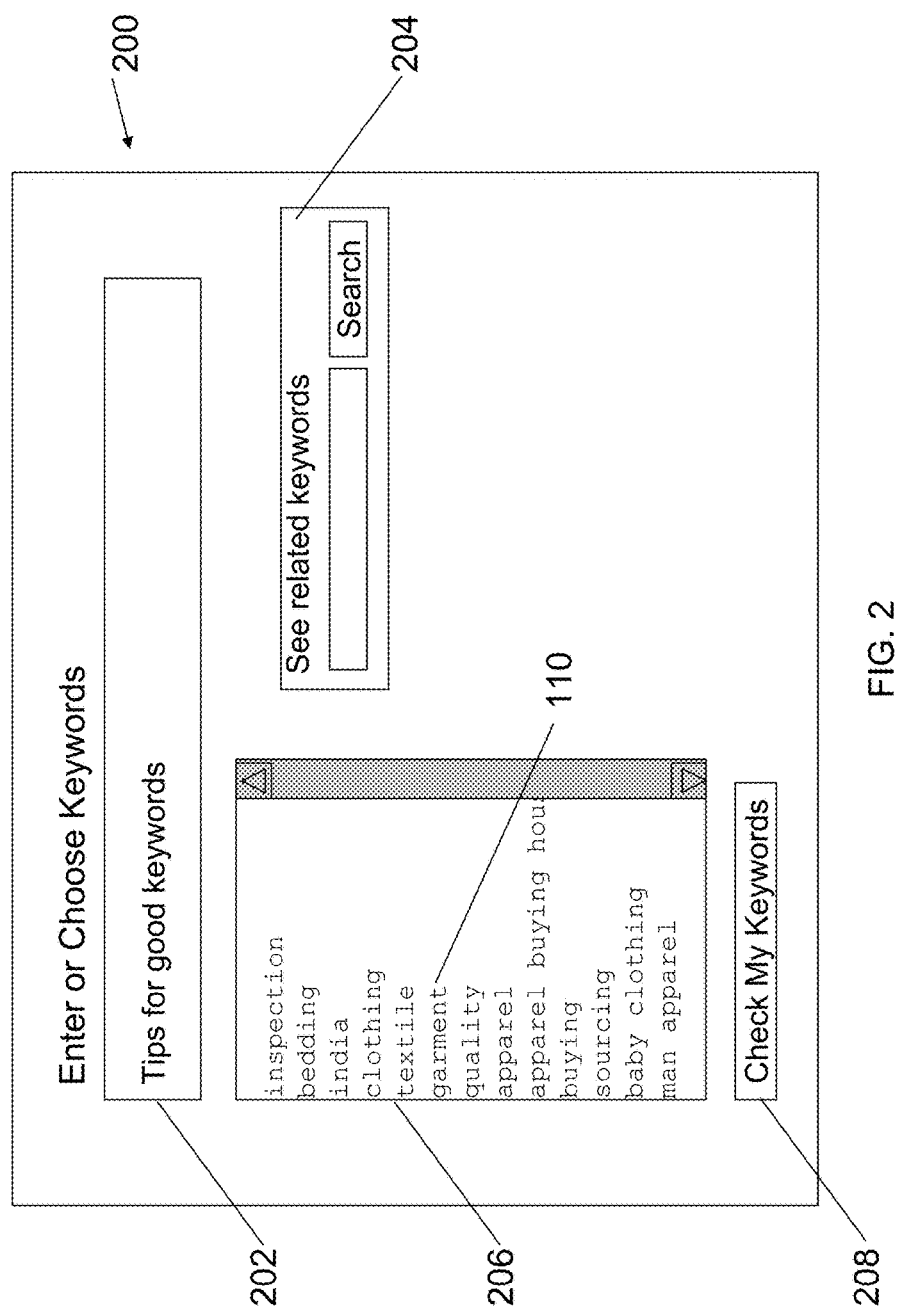
FIGS. 2 and 3 are diagrams of example graphical user interfaces.

FIG. 2 shows an example graphical user interface (GUI) 200 for allowing the advertiser 102 to choose or enter ad keywords 110. Tips 202 are provided to give suggestions on how to select good ad keywords 110. The advertiser 102 can enter one keyword and find other related keywords using a tool 204. A text box 206 allows the advertiser 102 to enter keywords 110. The advertiser 102 can click a button 208 to request the keyword checker 108 to check the quality of the keywords 110.

Figure 3:
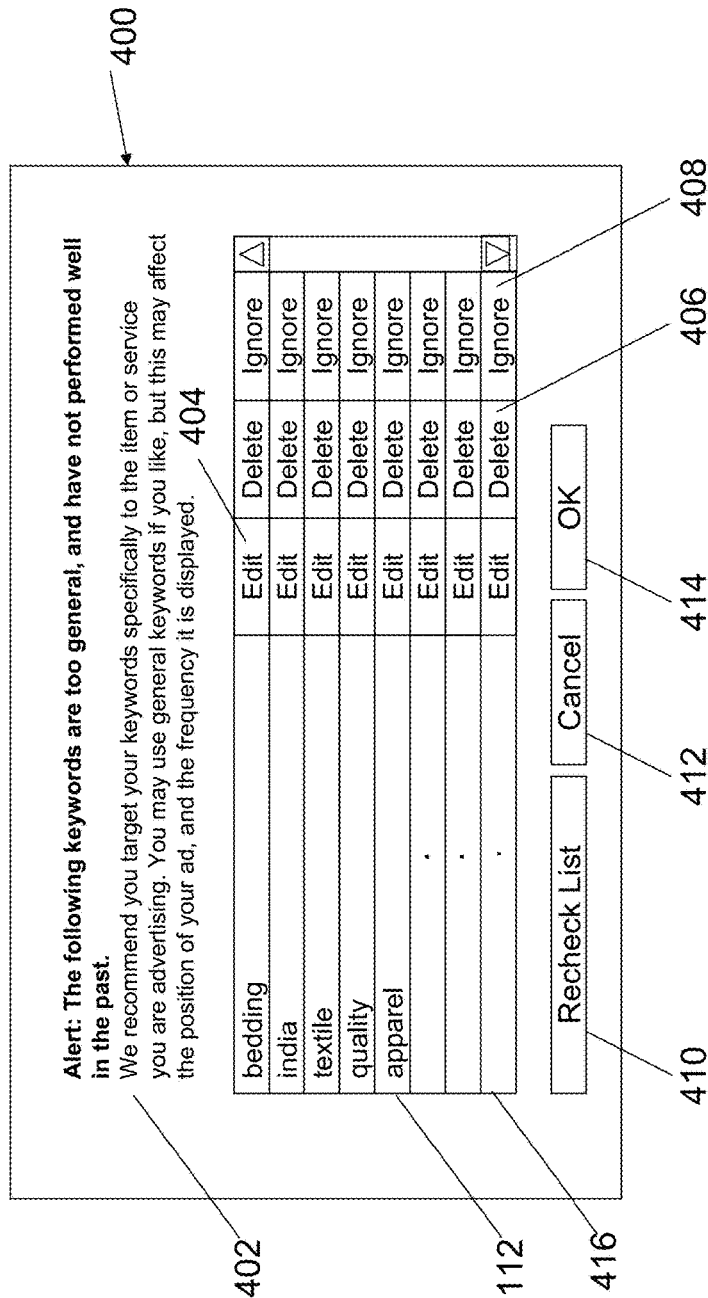

FIG. 3 shows an example graphical user interface GUI 400 that shows an alert message 402 along with a textbox 416 showing a list of low performing keywords 112. A message 402 informs the advertiser 102 that one or more keywords 112 has been identified as low-performing. Control buttons 404 allow the advertiser 102 to edit the keywords 112, control buttons 406 allow the advertiser 102 to remove the keywords 112 from being associated with the ad, and control buttons 408 allow the advertiser 102 to ignore the warning messages.

Clicking on the ignore control buttons 408 indicates to the keyword checker 108 that the advertiser 102 wishes to use the keyword 112, notwithstanding the determination by the keyword checker 108 that the keyword may cause the ad to have a low performance.

In some implementations, the advertiser 102 can see why each keyword 112 was flagged as being low performing by, e.g., hovering the mouse pointer over the keyword 112 or by interacting with a control (not shown) that when clicked on displays the reasons why the particular keyword was flagged.

After the advertiser 102 has edited, deleted, or accepted each keyword 112, the advertiser 102 can click on a control button 410 to recheck the list of keywords 112, click on a control button 412 to exit the GUI 400 without modifying the keywords, or click on a control button 414 to accept the keywords 112.

Figure 4:
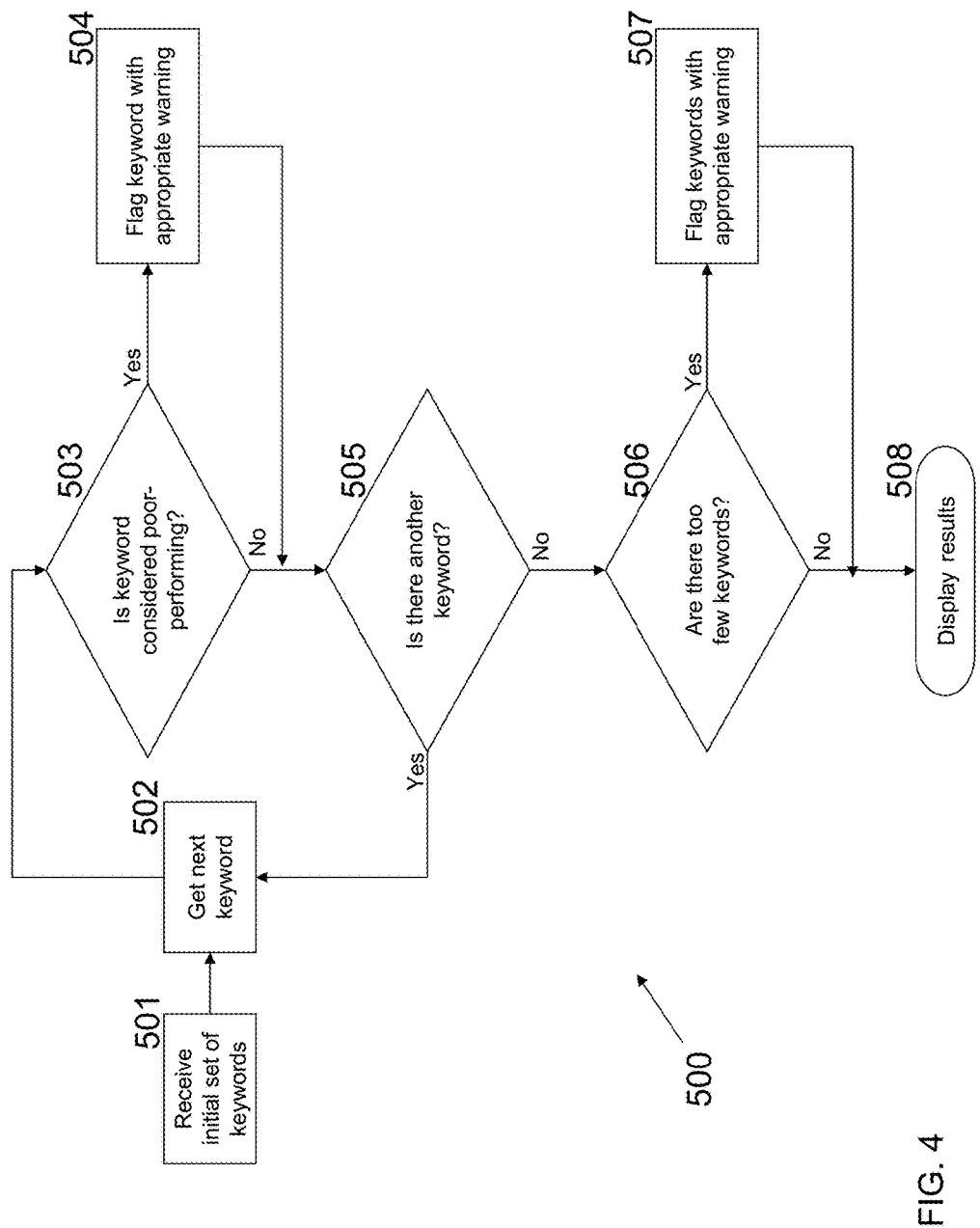
FIGS. 4 and 5 are flow diagrams of example processes.

FIG. 4 is a flow diagram of an example process 500 for identifying low performing keywords. For example, the process 500 can be performed by the keyword checker 108 of FIG. 1. The process 500 receives an initial set of keywords (501). For example, the process 500 can receive the initial set of keywords 110 using the GUI 300 (FIG. 2). The process 500 examines each keyword in the initial set (502), and determines whether the keyword is low-performing (503). If a keyword is determined to be low-performing, it is flagged with an appropriate warning (504). If there is another keyword in the initial set that has not been examined (505), the process 500 repeats steps 502 and 503 until all keywords in the initial set have been examined.

The process 500 examines the entire initial set of keywords to determine whether there are too few keywords (506). For example, if the total number of keywords in the initial set is less than a predetermined number (e.g., 5), and if the total traffic is below a predetermined threshold (e.g., 3600 impressions per year), the process 500 may flag the keywords with a message indicating that there are too few keywords (507). The process 500 displays the results 508. For example, the process 500 can display the results 508 using the GUI 400 (FIG. 3).

Figure 5:
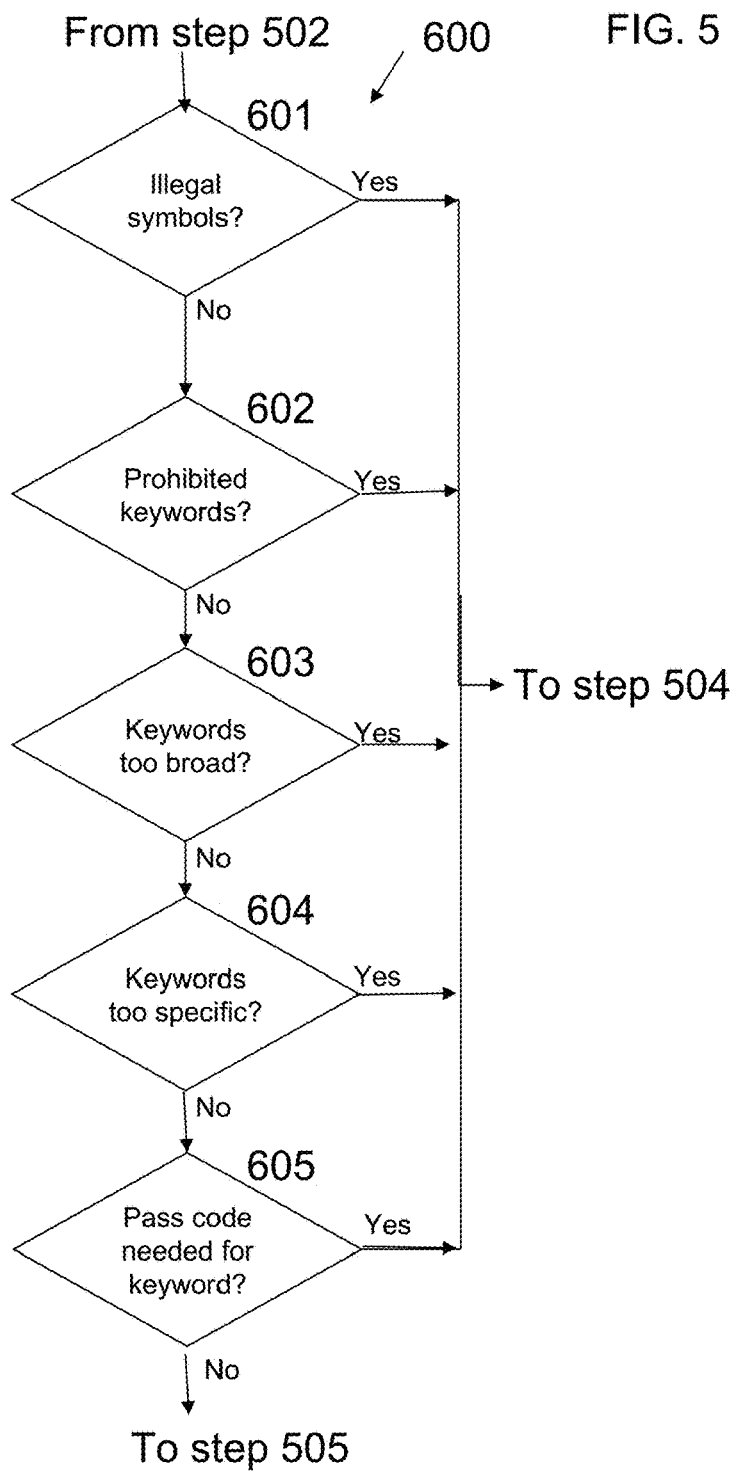

FIG. 5 is a flow diagram of a process 600 for implementing step 503 of the process 500. For example, the process 600 can be performed by the keyword checker 108 of FIG. 1. For each of the initial set of keywords, the process 600 determines whether an illegal symbol is included in the keyword (601). The illegal symbols can be, e.g., any non-character symbols. The process 600 determine whether the keyword is prohibited (602). For example, a keyword can be prohibited if it is offensive or abusive. The process 600 determines whether the keyword is too broad (603). For example, a keyword can be identified as being too broad if search volume is greater than a predetermined number (e.g., 12,000) of impressions per year, and the global click-through rate (average or median across advertisers) is below a predetermined value (e.g., 0.5).

The process 600 determines whether the initial set of keywords is too specific (604). For example, the initial set of keywords may be too specific if at least a predetermined percentage (e.g., 50%) of the set of keywords obtain fewer than a predetermined number (e.g., 300) of impressions per year, at least a predetermined percentage (e.g., 50%) of the low traffic keywords contain at least four words, and the total traffic is below a predetermined number (e.g., 1500) of impressions per year. The process 600 may also determine whether the initial set of keywords are too obscure. The process 600 flags a keyword that has been identified as requiring the advertiser 102 to enter a special pass code or identifier (605). The process 600 may perform additional checks to determine whether a keyword is low performing.

Figure 6:
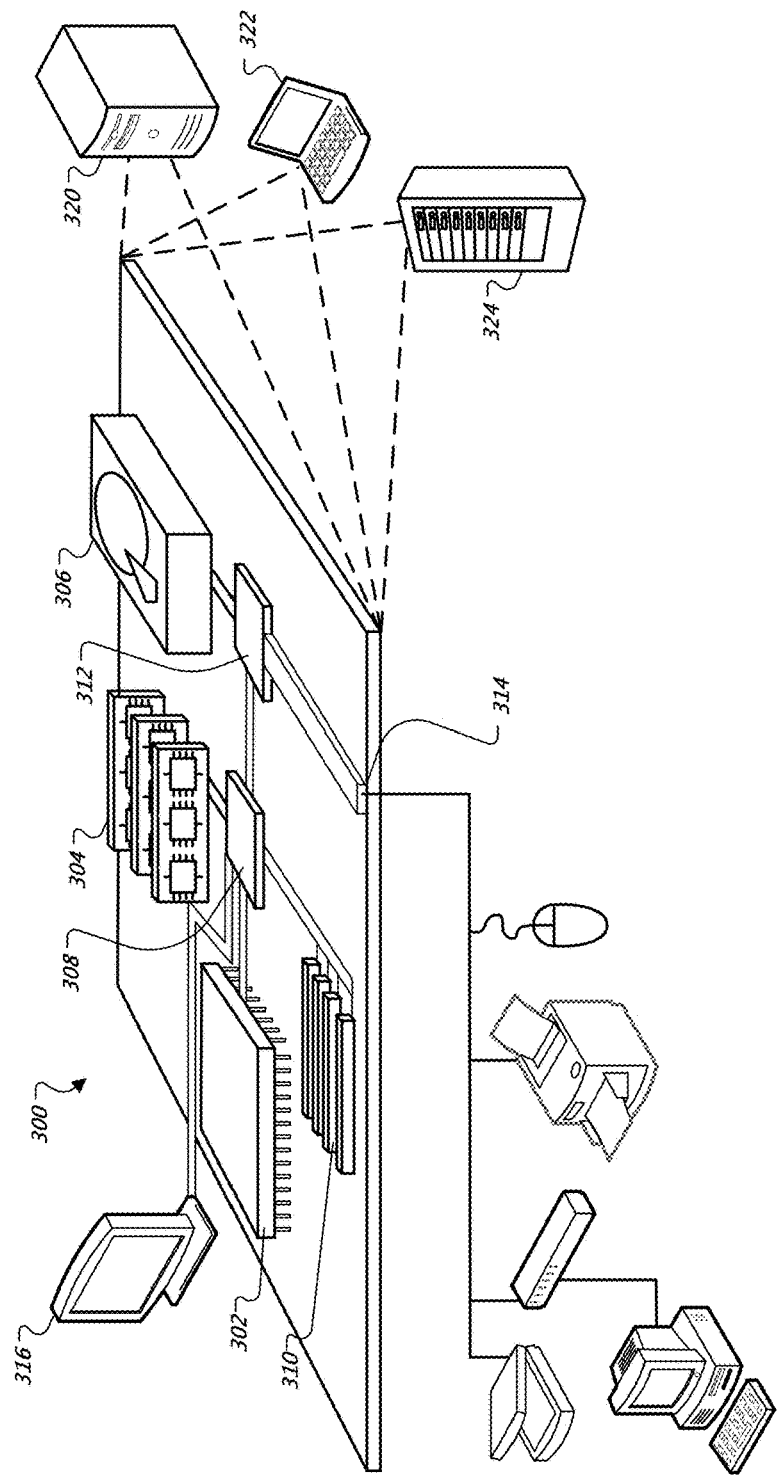
FIG. 6 is a schematic representation of a general computing system.

FIG. 6 is a schematic representation of a general computing system 300 that can be used to implement the system 100. Computing device 300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, memory on processor 302, or a propagated signal.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Each of such devices (e.g., standard server, rack server system, personal computer, laptop computer) may contain one or more of computing device 300, and an entire system may be made up of multiple computing devices 300 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated.

Though reference is made to determination of effectiveness of advertisements, the system 100 can determine the effectiveness of other forms of content including other forms of sponsored content. The ads 110 can include, e.g., text advertisements, audio advertisements, video advertisements, or Flash advertisements. The keyword checker 108 can provide a "quality score" for each keyword 112 and generally describe what problems are attributed to low quality. The on-line content can include audio programs, animation, and on-line games. The keywords can be associated with a single advertisement, multiple advertisements, and/or a topic associated with a good and/or service. The threshold values for various checks can be different from those described above.

In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method of providing an interactive user interface comprising:
    updating a display of a remotely located computing device to present an electronic user interface that provides a keyword entry control;
    receiving, through the electronic user interface, one or more keywords that are associated with an advertisement, wherein the one or more keywords are entered using the keyword entry control;
    determining, using one or more computer processors, that one or more of the one or more keywords are overbroad in accordance with a ratio of a number of times that the one or more keywords have been used in search queries provided by a set of users to a click-through rate of one or more other advertisements presented to the set of users responsive to the search queries, including:
    identifying, using one or more computer processors, one or more low-performing keywords from the one or more keywords based on determining that one or more of the one or more keywords are overbroad, the one or more low-performing keywords having a likelihood of causing the advertisement to have a performance below a threshold, the performance of the advertisement being determined based on a predefined criterion;
    updating, at the display of the computing device, the electronic user interface to present a visualization of a list of only the one or more low-performing keywords, the one or more low-performing keywords being a subset of the one or more keywords that had been entered using the keyword entry control, and to provide, for each of the one or more low-performing keywords, a set of one or more interactive controls corresponding to the low-performing keyword, the set of one or more interactive controls including a given keyword removal control that removes the corresponding low-performing keyword from being associated with the advertisement in response to user interaction with the given keyword removal control.

2. The method of claim 1, wherein determining that one or more of the one or more keywords are overbroad includes:
    (i) determining that the number of times that the one or more keywords have been used in search queries provided by the set of users is more than a predetermined number;
    (ii) determining that the click-through rate of the one or more other advertisements presented to the set of users responsive to the search queries is below a predetermined value, the one or more other advertisements being associated with one or more other advertisers; and
    (iii) determining that the ratio is below a predefined threshold value.

3. The method of claim 1, further comprising:
    determining, using one or more computer processors, that a given keyword from the one or more keywords includes an invalid non-character symbol or a symbol that prevents the advertisement from being served; and
    generating an alert message indicating that the given keyword includes the invalid non-character symbol or the symbol that prevents the advertisement from being served;

wherein updating the electronic user interface includes updating the electronic user interface to present a visualization of the alert message.

4. The method of claim 1, wherein the set of one or more interactive controls includes a control operable to edit the corresponding low-performing keyword.

5. The method of claim 1, wherein the set of one or more interactive controls includes a control operable to indicate that the corresponding low-performing keyword is to be associated with the advertisement, despite its low performance.

6. The method of claim 1, further comprising updating, at the display of the remotely located computing device, the electronic user interface to present information regarding why a particular low-performing keyword was identified as being low-performing.

7. The method of claim 6, wherein the electronic user interface is updated to present information regarding why the particular low-performing keyword was identified as being low-performing, in response to a pointer being hovered over the particular low-performing keyword.

8. The method of claim 6, wherein the electronic user interface is updated to present information regarding why the particular low-performing keyword was identified as being low-performing, in response to a control associated with the particular low-performing keyword being selected.

9. The method of claim 1, wherein identifying the one or more low-performing keywords includes determining whether the one or more keywords are obscure, wherein determining whether the one or more keywords are obscure includes:
   determining that a predetermined portion of the one or more keywords obtain fewer than a predetermined number of impressions for a given time period; and
   determining that total traffic on the one or more keywords is below a predetermined threshold for the given time period.

10. The method of claim 1, wherein identifying low-performing keywords includes determining that a total number of keywords associated with the advertisement is less than a predetermined number.

11. The method of claim 1, wherein identifying the one or more low-performing keywords includes determining whether the one or more keywords include a word or a phrase that is prohibited by a system for serving the advertisement.

12. A system comprising:
   one or more processors; and
   one or more memory elements including instructions that, when executed, cause the one or more processors to perform operations comprising:
   updating a display of a remotely located computing device to present an electronic user interface that provides a keyword entry control;
   receiving, through the electronic user interface, one or more keywords that are associated with an advertisement, wherein the one or more keywords are entered using the keyword entry control;
   determining, using one or more computer processors, that one or more of the one or more keywords are overbroad in accordance with a ratio of a number of times that the one or more keywords have been used in search queries provided by a set of users to a click-through rate of one or more other advertisements presented to the set of users responsive to the search queries, including:
   identifying, using one or more computer processors, one or more low-performing keywords from the one or more keywords based on determining that one or more of the one or more keywords are overbroad, the one or more low-performing keywords having a likelihood of causing the advertisement to have a performance below a threshold, the performance of the advertisement being determined based on a predefined criterion;
   updating, at the display of the computing device, the electronic user interface to present a visualization of a list of only the one or more low-performing keywords, the one or more low-performing keywords being a subset of the one or more keywords that had been entered using the keyword entry control, and to provide, for each of the one or more low-performing keywords, a set of one or more interactive controls corresponding to the low-performing keyword, the set of one or more interactive controls including a given keyword removal control that removes the corresponding low-performing keyword from being associated with the advertisement in response to user interaction with the given keyword removal control.

13. The system of claim 12, wherein determining that one or more of the one or more keywords are overbroad includes:
   (i) determining that the number of times that the one or more keywords have been used in search queries provided by the set of users is more than a predetermined number;
   (ii) determining that the click-through rate of the one or more other advertisements presented to the set of users responsive to the search queries is below a predetermined value, the one or more other advertisements being associated with one or more other advertisers; and
   (iii) determining that the ratio is below a predefined threshold value.

14. The system of claim 12, the operations further comprising:
   determining, using one or more computer processors, that a given keyword from the one or more keywords includes an invalid non-character symbol or a symbol that prevents the advertisement from being served; and
   generating an alert message indicating that the given keyword includes the invalid non-character symbol or the symbol that prevents the advertisement from being served;
   wherein updating the electronic user interface includes updating the electronic user interface to present a visualization of the alert message.

15. The system of claim 12, wherein the set of one or more interactive controls includes a control operable to edit the corresponding low-performing keyword.

16. The system of claim 12, wherein the set of one or more interactive controls includes a control operable to indicate that the corresponding low-performing keyword is to be associated with the advertisement, despite its low performance.

17. The system of claim 12, the operations further comprising updating, at the display of the remotely located computing device, the electronic user interface to present information regarding why a particular low-performing keyword was identified as being low-performing.

18. The system of claim 12, wherein identifying the one or more low-performing keywords includes determining whether the one or more keywords are obscure, wherein determining whether the one or more keywords are obscure includes:

determining that a predetermined portion of the one or more keywords obtain fewer than a predetermined number of impressions for a given time period; and determining that total traffic on the one or more keywords is below a predetermined threshold for the given time period.

19. The system of claim 12, wherein identifying low-performing keywords includes determining that a total number of keywords associated with the advertisement is less than a predetermined number.

20. The system of claim 12, wherein identifying the one or more low-performing keywords includes determining whether the one or more keywords include a word or a phrase that is prohibited by a system for serving the advertisement.

21. A computer-implemented method comprising:
updating, by one or more computer processors, a display of a computing device to present an electronic user interface that provides a keyword entry control;
receiving, through the electronic user interface, one or more keywords that are associated with an advertisement, wherein the one or more keywords are entered using the keyword entry control;
identifying, by one or more computer processors, one or more low-performing keywords from among the one or more keywords, the one or more low-performing keywords having a likelihood of causing the advertisement to have a performance below a threshold, the performance of the advertisement being determined based on a predefined criterion; and
updating, by one or more computer processors and, at the display of the computing device, the electronic user interface to present a visualization of a list of only the one or more low-performing keywords, the one or more low-performing keywords being a subset of the one or more keywords that had been entered using the keyword entry control, and to provide, for each of the one or more low-performing keywords, a set of one or more interactive controls corresponding to the low-performing keyword, the set of one or more interactive controls including a given keyword removal control that removes the corresponding low-performing keyword from being associated with the advertisement in response to user interaction with the given keyword removal control.

22. A computer-implemented method comprising:
updating, by one or more computer processors, a display of a computing device to present an electronic user interface that provides a keyword entry control;
receiving, through the electronic user interface, one or more keywords that are associated with an advertisement, wherein the one or more keywords are entered using the keyword entry control;
evaluating, by one or more computer processors, a quality of one or more keywords that are associated with the advertisement and identifying one or more low-performing keywords from among the one or more keywords based on determining at least one of (a) one or more of the keywords being too general, (b) one or more of the keywords being too specific, or (c) one or more of the keywords being too obscure; and
updating, at the display of the computing device, the electronic user interface to present a visualization of a list of only the one or more low-performing keywords, the one or more low-performing keywords being a subset of the one or more keywords that had been entered using the keyword entry control, and to provide, for each of the one or more low-performing keywords, a set of one or more interactive controls corresponding to the low-performing keyword, the set of one or more interactive controls including a given keyword removal control that removes the corresponding low-performing keyword from being associated with the advertisement in response to user interaction with the given keyword removal control.

23. A computer-implemented method comprising:
updating, by one or more computer processors, a display of a computing device to present an electronic user interface that provides a keyword entry control;
receiving, through the electronic user interface, one or more keywords that are associated with an advertisement, wherein the one or more keywords are entered using the keyword entry control;
identifying, by one or more computer processors, one or more low-performing keywords from among an initial group of the one or more keywords that are associated with the advertisement, the one or more low-performing keywords having a likelihood of causing the advertisement to have a performance below a threshold, wherein the low-performing keywords are identified based on a first criterion that individually examines each keyword in the initial group and a second criterion that examines the keywords in the initial group together; and
updating, by one or more computer processors and at the display of the computing device, the electronic user interface to present a visualization of a list of only the one or more low-performing keywords, the one or more low-performing keywords being a subset of the one or more keywords that had been entered using the keyword entry control, and to provide, for each of the one or more low-performing keywords, a set of one or more interactive controls corresponding to the low-performing keyword, the set of one or more interactive controls including a given keyword removal control that removes the corresponding low-performing keyword from being associated with the advertisement in response to user interaction with the given keyword removal control.

* * * * *

UNITED STATES PATENT AND TRADEMARK OFFICE
CERTIFICATE OF CORRECTION

PATENT NO. : 10,410,242 B1
APPLICATION NO. : 15/072706
DATED : September 10, 2019
INVENTOR(S) : Kavi J. Goel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this
Thirtieth Day of June, 2020

Andrei Iancu
*Director of the United States Patent and Trademark Office*